United States Patent
Wang et al.

(10) Patent No.: US 7,742,537 B2
(45) Date of Patent: Jun. 22, 2010

(54) TIME DOMAIN SYMBOL TIMING SYNCHRONIZATION CIRCUIT AND METHOD THEREOF FOR COMMUNICATION SYSTEMS

(75) Inventors: Chih-Chia Wang, Taichung (TW); Shu-Mei Li, Taipei (TW); Chingwo Ma, Danville, CA (US); Hsin-Chin Hsu, Taipei County (TW); Yi-Sheng Lin, Taipei County (TW)

(73) Assignee: Alpha Imaging Technology Corp., HsinChu (TW)

( * ) Notice: Subject to any disclaimer, the term of this patent is extended or adjusted under 35 U.S.C. 154(b) by 536 days.

(21) Appl. No.: 11/829,089

(22) Filed: Jul. 27, 2007

(65) Prior Publication Data

US 2009/0028254 A1 Jan. 29, 2009

(51) Int. Cl.
*H04K 1/10* (2006.01)
*H04L 27/28* (2006.01)

(52) U.S. Cl. ........................ 375/260; 375/343; 375/326; 375/362; 375/365; 370/208; 370/512; 370/514; 370/515; 370/509

(58) Field of Classification Search ................. 375/260, 375/340, 326, 343, 362, 365; 370/208, 509, 370/512, 514, 515
See application file for complete search history.

(56) References Cited

U.S. PATENT DOCUMENTS

| | | | | |
|---|---|---|---|---|
| 6,922,388 | B1* | 7/2005 | Laroia et al. | 370/208 |
| 7,424,067 | B2* | 9/2008 | Vanderperren et al. | 375/326 |
| 7,643,582 | B2* | 1/2010 | Chow et al. | 375/335 |
| 2007/0140106 | A1* | 6/2007 | Tsai et al. | 370/208 |
| 2008/0043858 | A1* | 2/2008 | Lim et al. | 375/260 |

* cited by examiner

*Primary Examiner*—Phuong Phu
(74) *Attorney, Agent, or Firm*—Jianq Chyun IP Office (57) ABSTRACT

A time domain symbol timing synchronization circuit is disclosed, which comprises: an autocorrelation function calculator for calculating cyclic prefix autocorrelation functions and an offset time estimator for searching peak positions of cyclic prefix autocorrelation functions to indicate symbol boundary of received communication symbols. The offset time estimator compares a current peak position and a previous peak position. If (a) the difference of the positions is larger than a threshold and (b) the current peak is smaller than a reference average peak, the current peak is determined as false; the offset time estimator weeds out and replaces the current peak position by the previous peak position; and the current peak is not introduced in the reference average peak calculation.

15 Claims, 7 Drawing Sheets

TIME DOMAIN SYMBOL TIMING SYNCHRONIZATION CIRCUIT AND METHOD THEREOF FOR COMMUNICATION SYSTEMS

BACKGROUND OF THE INVENTION

1. Field of Invention

The present invention generally relates to the symbol timing synchronization, and more particularly to the time domain symbol timing synchronization for orthogonal frequency division multiplexing (OFDM) systems under Doppler fading channel.

2. Description of Prior Art

In digital wireless communication, wireless channels will always be considered as fading and frequency selected channels. The effects of these channel impairments eliminate the bandwidth of communication systems. OFDM systems overcome these problems, due to that they transmit different information bits on different sub-carriers. OFDM systems modulate each sub-carrier with different information bits and output an OFDM symbol which is the sum of each sub-carrier. OFDM systems can resist the effect of multi-path reflection and Doppler spread. OFDM systems also have other advantages, such as high spectral efficiency due to nearly rectangular frequency spectrum for high numbers of sub-carriers, simple digital realization by using Fast Fourier Transform (FFT) and Inversed Fast Fourier Transform (IFFT), and so on. Thus OFDM becomes a mainstream technology in digital wireless communication.

Many standards adapt OFDM technology, such as digital audio broadcasting (DAB), digital video broadcasting (DVB), IEEE 802.11/a/g/n, IEEE 802.16, HIPERLAN/2, and etc.

In the wireless channel, the received OFDM symbol may be a timing offset symbol (i.e. there is a delay time between transmission signal and received signal.). If the FFT at receiver end doesn't know when a received OFDM symbol starts, the output data of the FFT are erroneous. In order to avoid the symbol timing offset, the OFDM receiver must achieve symbol timing synchronization to get the precise symbol boundary.

Reliable receiver synchronization is one of the most important issues in OFDM systems. One of the most important synchronization issues for OFDM systems is to know when a received OFDM symbol starts, i.e. the symbol timing synchronization.

Figure 1:
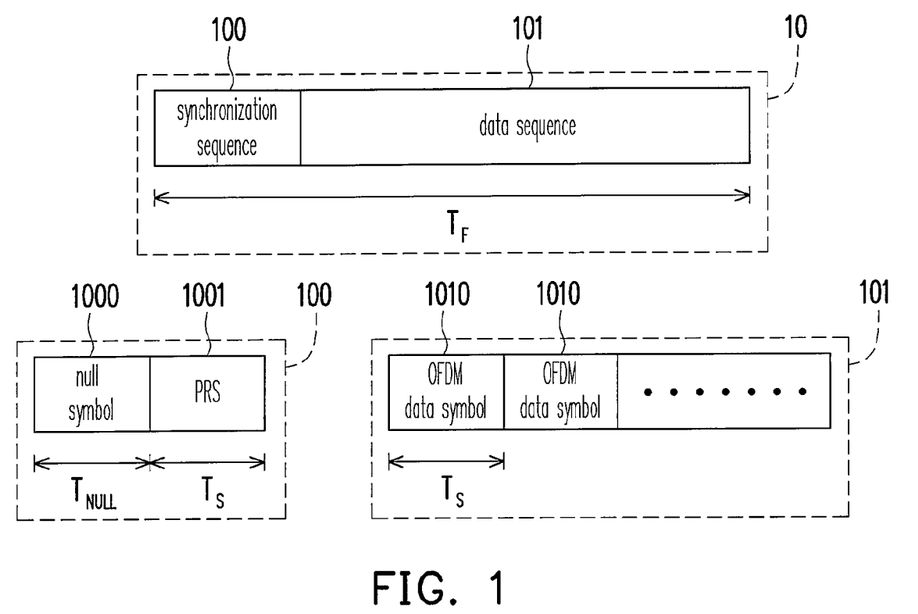
FIG. 1 is a schematic diagram showing the frame structure of the DAB standard.

The transmission signal of some standards is built up around a transmission frame structure. Such as DAB, the transmission structure contains the synchronization sequence and data sequence. FIG. 1 is a schematic diagram showing the frame structure of the DAB standard. The transmission frame duration is denoted by $T_F$. This transmission frame 10 contains a synchronization sequence 100 and a data sequence 101. The transmission frame 10 consists of consecutive OFDM symbols. The number of OFDM symbols of the transmission frame 10 is dependent on the transmission mode. The synchronization sequence 100 in any transmission mode occupies the first two OFDM symbols of each transmission frame 10.

The synchronization sequence 100 contains two OFDM symbols. Wherein, the first OFDM symbol is a null symbol 1000, and the second OFDM symbol is a phase reference symbol (PRS) 1001. The data sequence 101 consists of consecutive OFDM data symbols 1010. The duration of the null symbol 1000 is $T_{NULL}$, and the duration of the other OFDM symbols in the transmission frame is $T_s$. The null symbol 1000 can be used for coarse symbol timing synchronization. The PRS 1001 can be used for channel estimation and fine symbol timing synchronization.

Figure 2:
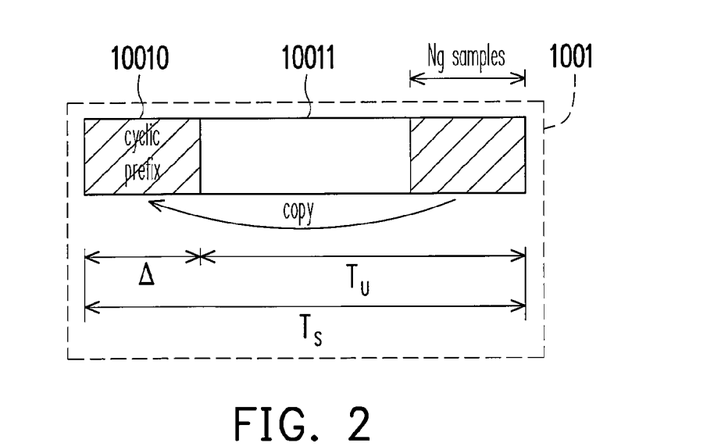
FIG. 2 is a schematic diagram showing the cyclic prefix characteristics of PRS.

FIG. 2 is a schematic diagram showing the cyclic prefix characteristics of the PRS 1001. The PRS 1001 contains a cyclic prefix 10010 and a phase reference sequence 10011. Wherein, the cyclic prefix 10010 is copied from the last $N_g$ samples of phase reference sequence 10011. The duration of cyclic prefix 10010 is $\Delta$, and the duration of phase reference sequence 10011 is $T_U$. The phase reference 10011 sequence is specified in the DAB standard.

Figure 3:
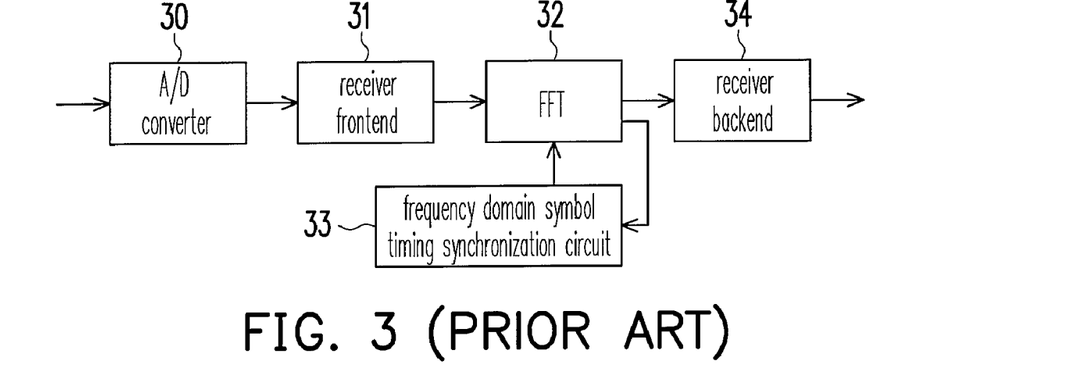
FIG. 3 is a block diagram showing the conventional DAB receiver.

FIG. 3 is a block diagram showing the conventional DAB receiver. This receiver comprises an A/D converter 30, a receiver frontend 31, a FFT 32, a frequency domain symbol timing synchronization circuit 33, and a receiver backend 34. Wherein, the receiver frontend 31 is connected to the A/D converter 30. The FFT 32 is connected to the receiver frontend 31. The frequency domain symbol timing synchronization circuit 33 is connected to the FFT 32. The receiver backend 34 is connected to the FFT 32.

See FIG. 3. The A/D converter 30 receives analog signals from the transmitter and converts the analog signals to digital signals. The receiver frontend 31 receives the digital signals from the A/D converter 30 and performs signal processing, such as filtering of adjacent channel interference, auto-gain control, cyclic prefix removal, clock recovery and so on. The FFT 32 receives the digital data from the receiver frontend 31 and does fast Fourier transform of received digital signals. The frequency domain symbol timing synchronization circuit 33 is used to estimate the symbol boundary of the OFDM symbol and to indicate the FFT 32 when the received OFDM symbol starts. The receiver backend 34 performs signal processing, such as decoding, demodulation, deinterleaving and so on.

The conventional symbol timing synchronization uses the frequency domain symbol timing synchronization circuit 33 to estimate the channel Impulse response. Since the frequency domain symbol timing synchronization circuit 33 obtains the precise symbol boundary from the estimated channel impulse response, the frequency domain symbol timing synchronization circuit 33 then indicates the FFT 32 when the received OFDM symbol starts. Thus the symbol timing synchronization is achieved. The more details about the above symbol timing synchronization are stated next.

Figure 4:
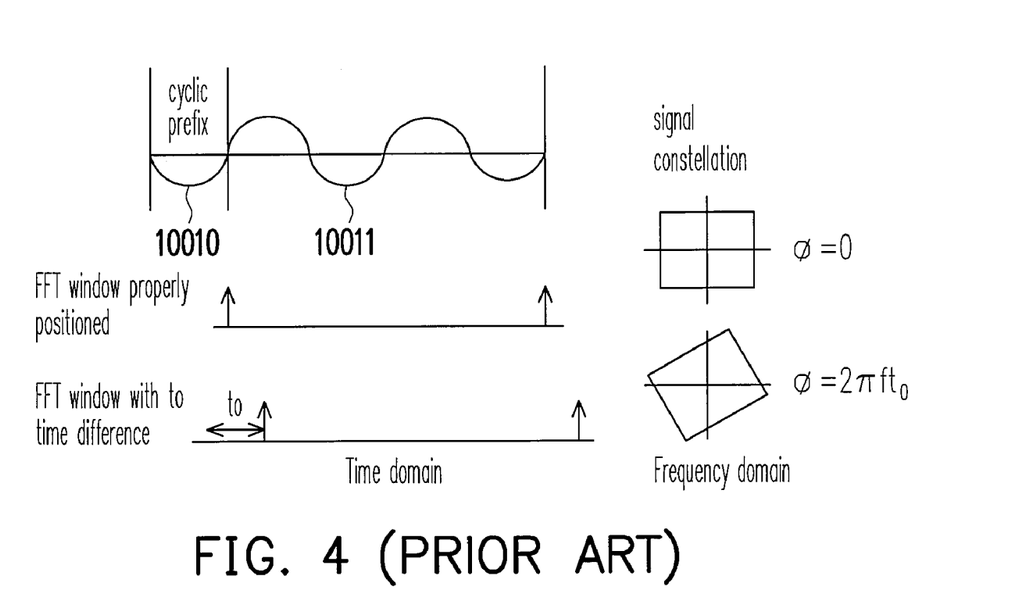
FIG. 4 is a schematic diagram showing the conventional frequency domain symbol timing synchronization.

See FIG. 3 and FIG. 4. FIG. 4 is a schematic diagram showing the conventional frequency domain symbol timing synchronization. Assume that the received signal without noise r(t)=s(t)*h(t) is the convolution of the transmit signal s(t) and the channel impulse response h(t). In the frequency domain, the Fourier transform of the received signal R(f)=S(f)H(f) is the product of the Fourier transform of the transmit signal S(f) and the Fourier transform of the channel impulse response H(f). By transmitting phase reference sequence 10011 as transmit signal s(t), since the phase reference sequence 10011 is specified in the DAB standard, the Fourier transform of the transmit signal s(f) is known by the receiver. Hence, after frequency domain symbol timing synchronization circuit 33 divides the Fourier transform of the received signal R(f) by the Fourier transform of the transmit signal S(f) and does IFFT of H(f) consequently, the frequency domain symbol timing synchronization circuit 33 can obtain an estimated channel response h(t). See FIG. 4, in this case, the signal constellation of the transmit signal s(t) has no phase rotation. Thus the frequency domain symbol timing synchronization circuit 33 indicates the FFT 32 that the symbol has no offset, and the precise symbol boundary is obtained. If a timing offset signal is received at the receiver end, the received signal $r(t)=s(t-t_0)*h(t)$ is the convolution of the timing offset signal $s(t-t_0)$ and channel impulse response $h(t)$. Then the frequency domain symbol timing synchronization circuit 33 obtains the Fourier transform of the received signal $R(f)=S(f)H(f)\exp(-j2\pi ft_0)$. As showed in FIG. 4, in this case, the signal constellation of the timing offset signal $s(t-t_0)$ have a phase rotation $2\pi ft_0$ compared to the signal constellation of the transmission signal $s(t)$. Thus the frequency domain symbol timing synchronization circuit 33 obtains an estimated channel response $h(t-t_0)$. Finally the frequency domain symbol timing synchronization circuit 33 indicates FFT 32 that the offset time of received OFDM symbol is $t_0$. So the FFT 32 knows that the symbol starts at to, and the symbol timing synchronization is achieved.

The conventional symbol timing synchronization scheme obtains the precise symbol boundary from frequency domain calculation, so the received signal at the receiver end must do the FFT and IFFT once. This scheme needs high computation complexity. In modern wireless networks, high computation complexity can not satisfy the demands of real-time service. Additionally, the effect of the Doppler fading channel may cause the conventional symbol timing synchronization scheme get a wrong symbol boundary.

In order to solve these and other problems as stated above, the embodiment of the invention provides a time domain symbol timing synchronization apparatus and method thereof under Doppler fading channel.

SUMMARY OF THE INVENTION

Accordingly, the present invention is directed to a time domain symbol timing synchronization for orthogonal frequency division multiplexing (OFDM) systems under Doppler fading channel.

The present invention provides a time domain symbol timing synchronization circuit in a receiver of a communication system, for getting symbol boundary of received communication symbols having phase reference sequences performing like pseudo-noise sequences. The time domain symbol timing synchronization circuit comprising an autocorrelation function calculator and an offset time estimator. Wherein, the offset time estimator is coupled to the autocorrelation function calculator. The autocorrelation function calculator is used to calculate the cyclic prefix autocorrelations. The offset time estimator is used to search the positions at the peaks of cyclic prefix autocorrelation functions to indicate symbol boundary of received communication symbols. The offset time estimator compares a position at a peak of a current cyclic prefix autocorrelation function of received communication symbols and a position at a peak of a previous cyclic prefix autocorrelation function of received communication symbols. If the difference of the positions is larger than a threshold and the peak of the current cyclic prefix autocorrelation function is smaller than a reference average peak, the peak of the current cyclic prefix autocorrelation function is determined as false, the offset time estimator weeds out and replaces the position at the peak of the current cyclic prefix autocorrelation function by the position at the peak of the previous cyclic prefix autocorrelation function, and the current peak is not introduced in calculation of the reference average peak. The reference average peak is a moving average of peaks of a plurality of previous cyclic prefix autocorrelation functions.

The present invention provides a receiver in a communication system. The receiver comprising an converter, a receiver frontend, a FFT, a receiver backend, and a time domain symbol timing synchronization circuit. Wherein, the receiver frontend is coupled to the converter. The FFT unit is coupled to the receiver frontend. The receiver backend is coupled to the FFT unit. The time domain symbol timing synchronization circuit is coupled to the receiver frontend and the FFT unit. The converter is used to convert analog input signals into digital signals. The receiver frontend is used to perform signal processing on the digital signals from the converter. The FFT unit is used to perform FFT on output signals from the receiver frontend. The receiver backend is used to perform signal processing on output signals from the FFT unit. The time domain symbol timing synchronization circuit is used to indicate symbol boundary of received communication symbols and getting symbol boundary of the received communication symbols with phase reference sequences performing like pseudo-noise sequences. The time domain symbol timing synchronization circuit compares a position at a peak of a current cyclic prefix autocorrelation function of the received communication symbols and a position at a peak of a previous cyclic prefix autocorrelation function of the received communication symbols. If (a) a difference of the positions is larger than a threshold and (b) the peak of the current cyclic prefix autocorrelation function is smaller than a reference average peak, the peak of the current cyclic prefix autocorrelation function is determined as false; the time domain symbol timing synchronization circuit weeds out and replaces the position at the peak of the current cyclic prefix autocorrelation function by the position at the peak of the previous cyclic prefix autocorrelation function, and the current peak is not introduced in calculation of the reference average peak. The reference average peak is a moving average of peaks of a plurality of previous cyclic prefix autocorrelation functions.

The present invention provides a time domain symbol timing synchronization method for communication systems. A position at a peak of a previous cyclic prefix autocorrelation function of the received communication symbols is searched. A position at a peak of a current cyclic prefix autocorrelation function of the received communication symbols is searched. The peak positions are compared. If a difference between the peak positions is larger than a threshold and the peak of the current cyclic prefix autocorrelation function is smaller than a reference average peak, the position at the peak of the current cyclic prefix autocorrelation function is wed out and replaced by the position at the peak of the previous cyclic prefix autocorrelation function. Indication of symbol boundary of the received communication symbols is based on the peak position which is not wed out.

According to an embodiment of the present invention, the communication system is an OFDM system and the receiver is a DAB receiver or a DVB receiver which receives signals under Doppler fading channel.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiment of the invention, examples of which are illustrated in the accompanying drawings. Wherever possible, the same reference numbers are used in the drawings and the description to refer to the same or like parts.

Figure 5:
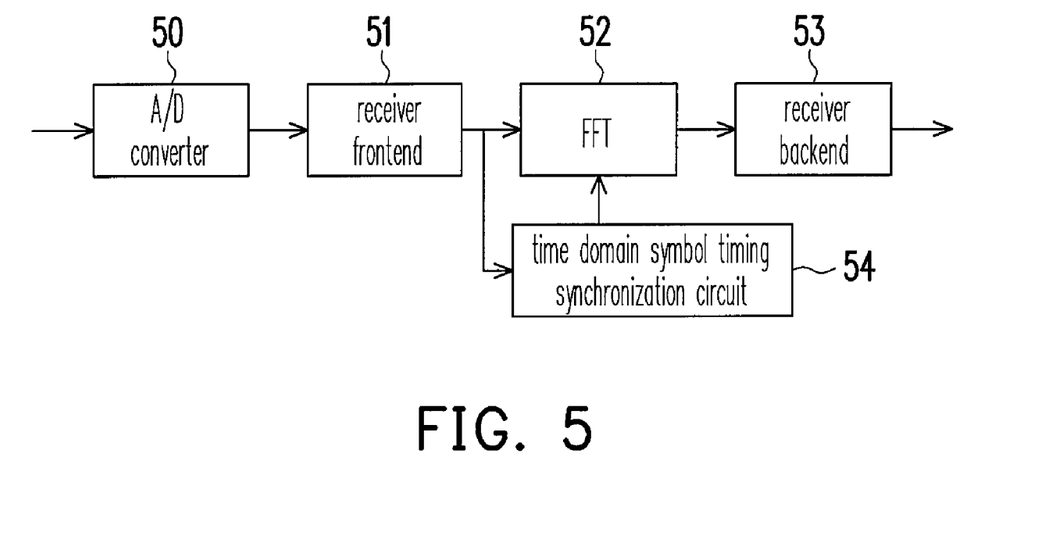
FIG. 5 is a block diagram showing an embodiment of the invention applied in the DAB receiver.

FIG. 5 is a block diagram showing an embodiment of the invention applied in the DAB receiver. According to the embodiment of the invention, the DAB receiver comprises an A/D converter 50, a receiver frontend 51, a FFT 52, a receiver backend 53 and a time domain symbol timing synchronization circuit 54. Wherein, the receiver frontend 51 is connected to the A/D converter 50. The FFT 52 is connected to the receiver frontend 51. The receiver backend 53 is connected to the FFT 52. And the time domain symbol timing synchronization circuit 54 is connected to the receiver frontend 51.

See FIG. 5. The A/D converter 50 receives analog signals from the transmitter and converts the analog signals to digital signals. The receiver frontend 51 receives the digital signals from the A/D converter 50 and performs signal processing, such as filtering of adjacent channel interference, auto-gain control, cyclic prefix removal, clock recovery and so on. The FFT 52 receives the digital data from the receiver frontend 51 and does the fast Fourier transform of received digital signals. The receiver backend 53 performs signal processing, such as decoding, demodulation, deinterleaving and so on. The time domain symbol timing synchronization circuit 54 finds the end of the cyclic prefix 10010 to indicate the FFT 52 when the received OFDM symbol starts. Thus the time domain symbol timing synchronization circuit 54 gets the symbol boundary of the OFDM symbol.

Figure 6:
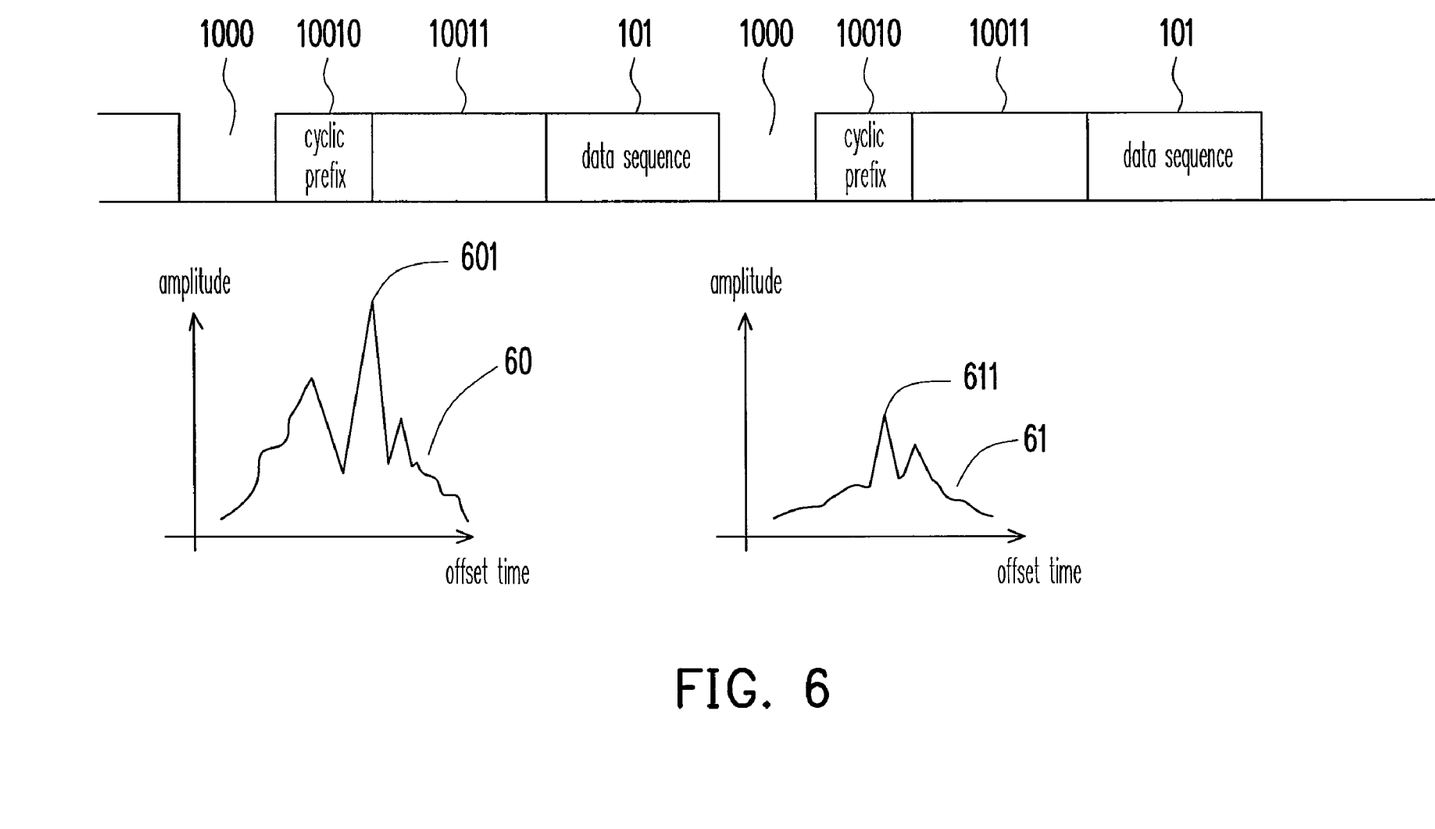
FIG. 6 is a schematic diagram showing the time domain symbol timing synchronization.

FIG. 6 is a schematic diagram showing the time domain symbol timing synchronization according to the embodiment of the invention. The cyclic prefix 10010 is copied from the last $N_g$ samples of the phase reference sequence 10011. Since the phase reference sequence 10011 is specified the DAB standard, the cyclic prefix 10010 is known by the receiver. As showed in FIG. 6, the time domain symbol timing synchronization circuit 54 thus can calculate the cyclic prefix autocorrelation function 60. The phase reference sequence 10011 is designed to perform like a pseudo-noise (PN) sequence whose autocorrelation function has a sharp peak, so the cyclic prefix 10010 also performs like a PN sequence and the cyclic prefix autocorrelation function 60 has a sharp peak 601 at the end of cyclic prefix 10010. Therefore, the time domain symbol timing synchronization circuit 54 can get a precise symbol boundary and indicate the FFT 52 when the OFDM symbol starts.

Though the above embodiment is applied to the DAB standard, the time domain symbol timing synchronization circuit 54 can be also adapted in other standards in which the phase reference sequence is designed to perform like a PN sequence, such as DVB standard and etc.

Figure 7:
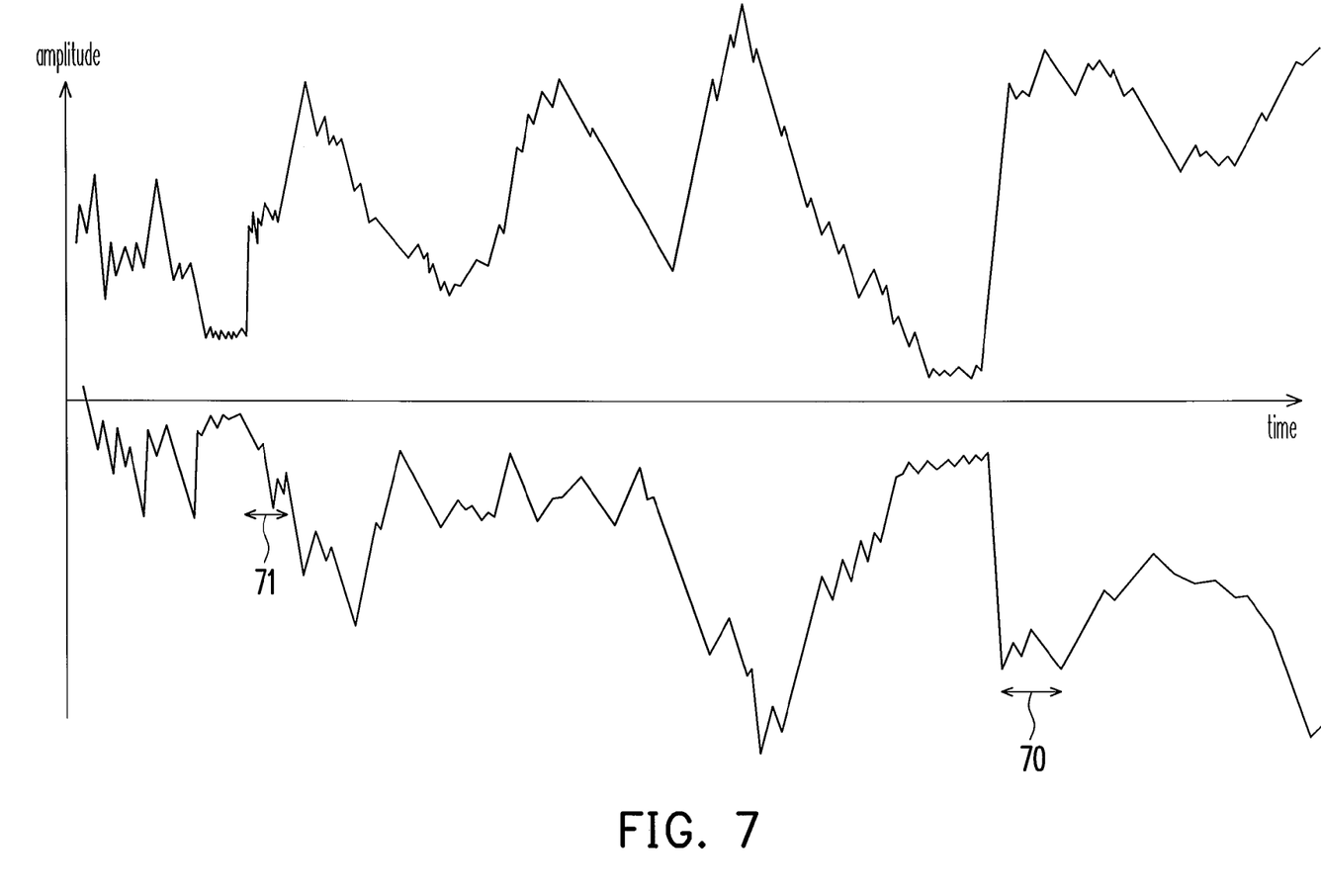
FIG. 7 is a waveform diagram showing the DAB transmission frames transmit under Doppler fading channel.

Mostly the wireless channel can be considered as a Doppler fading channel. The effect of Doppler fading channel makes the amplitudes and phases of the OFDM symbols fluctuate fast. FIG. 7 is a waveform diagram showing the DAB transmission frames transmitted under Doppler fading channel. As showed in the FIG. 7, the amplitudes of PRS in the first transmission frame 70 are smaller than the amplitudes of PRS in the second transmission frame 71. Doppler fading channel makes the amplitudes of OFDM symbol fluctuate fast. As showed in FIG. 6, the cyclic prefix autocorrelation function 61 is calculated under Doppler fading channel, the peak 611 of the cyclic prefix autocorrelation function 61 is a false peak. In other words, the position of the peak is not at the end of the cyclic prefix 10010, and the precise symbol boundary can't be obtained.

In order to solve this problem, the time domain symbol timing synchronization circuit 54 weeds out the false peak caused by the effect of Doppler fading channel. The time domain symbol timing synchronization circuit 54 compares the position at the peak 611 of the current cyclic prefix autocorrelation function 61 and the position at the peak 601 of the previous cyclic prefix autocorrelation function 60. If the difference between the two positions is larger than the specified threshold and the peak of the current cyclic prefix autocorrelation function is smaller than the reference average peak, the time domain symbol timing synchronization circuit 54 weeds out the position at the peak 611 of the current cyclic prefix autocorrelation function 61 and uses the position at the peak 601 of the previous cyclic prefix autocorrelation function 60 as the current position. The reference average peak is the moving average of these previous peaks, and if the above condition occurs, the current peak is not calculated in the moving average (i.e. the current peak is weeded out in the moving average calculation.).

Here we use an exemplary algorithm to state the action of the time domain symbol timing synchronization circuit 54. This exemplary algorithm is showed as below (a) $St\_index\_diff = abs(st\_index - pre\_index)$;

(b) $ref\_peak = sum(peak\_amp(i-j)/m * ratio(i-j))$ from $j=1$ to $j=m$, (c) if$((peak\_amp(i) < ref\_peak)$ && $(St\_index\_diff > diffrange))$;

then (st_index=pre_index) and (weed out this peak into the ref_peak calculation)

In section (a) of the above algorithm, St_index_diff is the position difference between the current position at the peak of the current cyclic prefix autocorrelation function and the previous position at the peak of the previous cyclic prefix autocorrelation function, abs(·) means the operation of taking the absolute value, st_index is the position at the peak 611 of the current cyclic prefix autocorrelation function 61, and pre_index is the position at the peak 601 of the previous cyclic prefix autocorrelation function 60. In (a), the difference of positions at the peaks between the current cyclic prefix autocorrelation function 61 and previous cyclic prefix autocorrelation function 60 is calculated as the parameter St_index_diff. In section (b) of the above algorithm, "ref_peak" is a reference average peak which is the moving average of these previous peaks, sum(·) means the operation of summation, peak_amp(i-j) is the previous j-th peak corresponding to the current peak peak_amp(i), m is the sample number of this moving average operation, and ratio (i-j) is the weighting factor of the previous j-th peak. For example, ratio(i-j) is in the range from 0.5 to 1. The reference average peak is calculated by for example, a moving average method. In section (c) of the above algorithm, it is decided whether the current peak, peak_amp(i), of the cyclic prefix autocorrelation function is smaller than the reference average peak, ref_peak, and whether the position difference, St_index_diff, is larger than the specified position difference threshold, diffrange. If true, the time domain symbol timing synchronization circuit 54 will weed out the position at the peak 611 of the current cyclic prefix autocorrelation function 61 and use the position at the peak 601 of the previous cyclic prefix autocorrelation function 60 as the current position; and the time domain symbol timing synchronization circuit 54 will not take the current peak into the moving average calculation. Moreover, increase of the sample number of moving average, m, can get the more precise symbol boundary, but this will increase the computation complexity which may prohibit the demand of real-time service.

Figure 8:
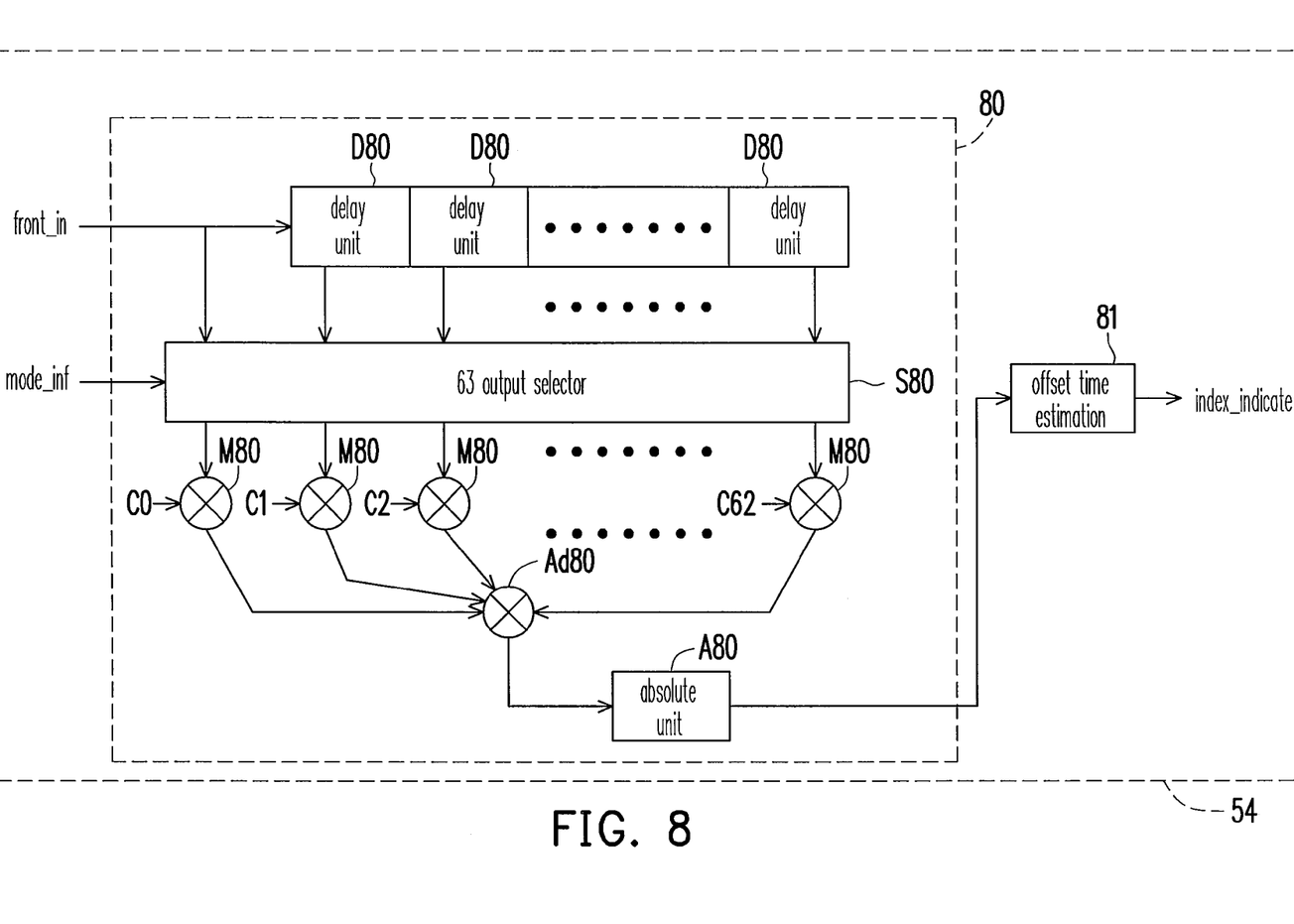
FIG. 8 is a block diagram showing an implementation of the time domain symbol timing synchronization circuit according to the embodiment.

FIG. 8 is a block diagram showing an implementation of the time domain symbol timing synchronization circuit 54. In this implementation, it is assumed the FFT has input buffer. This circuit 54 comprises an autocorrelation function calculator 80 and an offset time estimator 81. The offset time estimator 81 is connected to the autocorrelation function calculator 80. The autocorrelation function calculator 80 comprises 504 delay units D80, a 63 output selector S80, 63 multipliers M80, an adder Ad80, and an absolute unit A80. The digital signal front_in from the receiver frontend is delayed by these delay units D80. The DAB standard has four modes. The cyclic prefix in Mode 3 has the minimum duration, and the cyclic prefix in Mode 1 has the longest duration. Thus the 63 output selector S80 receives the information of the mode mode_inf and selects the proper output according to this information of the mode mode_inf. Since Mode 3 of DAB standard specifies the cyclic prefix has 63 samples, the 63 output selector S80 is used and the 504 delay units D80 may be used in to other operation modes. For Mode 1, the known cyclic prefix is down-sampled by 8. For Mode 2, the known cyclic prefix is down-sampled by 2. For Mode 4, the known cyclic prefix is down-sampled by 4. Thus the circuit 54 can operate in the four modes without four designed circuits. Each multiplier M80 multiplies a corresponding output of the 63 output selector S80 with a number of coefficients C0~C62, and the adder Ad80 sums outputs from the multipliers M80. Coefficients C0~C62 are known, since the cyclic prefix is the copies of the phase reference sequence. Then the absolute unit A80 gets the absolute value of the output of the adder Ad80. With the incorporation above these units, the autocorrelation function calculator 80 thus can calculate the absolute value of the cyclic prefix autocorrelation function. The offset time estimator 81 receives the absolute value of the cyclic prefix autocorrelation function and finds the position at the peak to indicate the FFT when the received OFDM symbol starts. Since the FFT knows the symbol boundary by the signal index_indicate, it starts to read its buffer from the precise position and to do FFT. Thus the signal index_indicate in fact is an address signal which is used to address the FFT buffer.

As stated above, the effect of Doppler fading channel may cause a false peak, so the offset time estimator 81 weeds out the false peak caused by the effect of Doppler fading channel and uses the position at the peak of the previous cyclic prefix autocorrelation function as the position at the peak of the current cyclic prefix autocorrelation function. The offset time estimator 81 compares the position at the peak of the current cyclic prefix autocorrelation function and the position at the peak of the previous cyclic prefix autocorrelation function. If the difference of the two positions is larger than the threshold and the peak of the current cyclic prefix autocorrelation function is smaller than the reference average peak, the offset time estimator 81 weeds out the position at the peak of the current cyclic prefix autocorrelation function and uses the position at the peak of the previous cyclic prefix autocorrelation function as the current position. The reference average peak is the moving average of these previous peaks, and if the above condition occurs, the current peak is not calculated in the moving average (i.e. the current peak is weeded out in the moving average calculation.).

Figure 9:
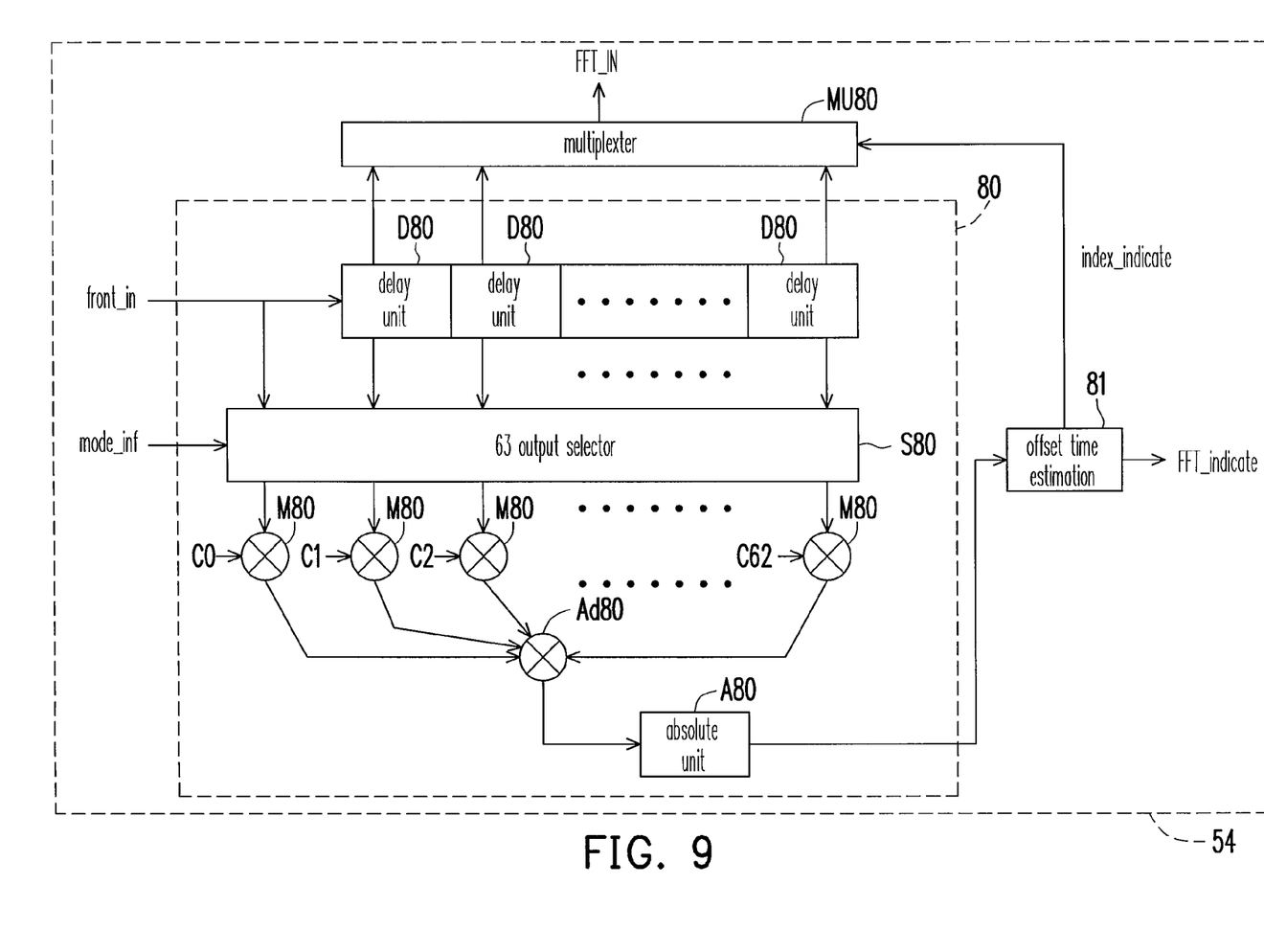
FIG. 9 is a block diagram showing another implementation of the time domain symbol timing synchronization circuit according to the embodiment.

FIG. 9 shows another implementation of the time domain symbol timing synchronization circuit. In this implementation, when the offset time estimator 81 find the position at the peak of the current cyclic prefix autocorrelation function, the offset time estimator 81 outputs a control signal index_indicate to control the multiplexer MU80. The multiplexer MU80 selects one output from the outputs of the delay units D80, under control of the control signal index_indicate, and outputs this selected signal FFT_IN to the FFT. The offset time estimator 81 receives the absolute value of the cyclic prefix autocorrelation function and finds the position at the peak to indicate the FFT when the received OFDM symbol starts. Thus the signal FFT_indicate in fact is a valid signal which is used to trigger the FFT.

The embodiment of the invention provides a time domain symbol timing synchronization circuit and method thereof under Doppler fading channel by low computation complexity. The time domain symbol timing synchronization circuit and method thereof under Doppler fading channel can also weed out the false peak caused by the effect of Doppler fading channel. Thus the receiver can get a precise symbol boundary.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A time domain symbol timing synchronization circuit in a receiver of a communication system, for getting symbol boundary of received communication symbols having phase reference sequences performing like pseudo-noise sequences, the time domain symbol timing synchronization circuit comprising:

an autocorrelation function calculator, for calculating cyclic prefix autocorrelation functions; and an offset time estimator, coupled to the autocorrelation function calculator, for searching positions at peaks of the cyclic prefix autocorrelation functions to indicate symbol boundary of received communication symbols, wherein the offset time estimator compares a position at a peak of a current cyclic prefix autocorrelation function of received communication symbols and a position at a peak of a previous cyclic prefix autocorrelation function of received communication symbols;

if a difference of the positions is larger than a threshold and the peak of the current cyclic prefix autocorrelation function is smaller than a reference average peak, the peak of the current cyclic prefix autocorrelation function is determined as false; the offset time estimator weeds out and replaces the position at the peak of the current cyclic prefix autocorrelation function by the position at the peak of the previous cyclic prefix autocorrelation function; and the current peak is not introduced in calculation of the reference average peak.

2. The time domain symbol timing synchronization circuit of claim 1, wherein the reference average peak is a moving average of peaks of a plurality of previous cyclic prefix autocorrelation functions.

3. The time domain symbol timing synchronization circuit of claim 1, wherein the autocorrelation function calculator comprises:

a plurality of serial-connected delay units, for delaying a digital input signal;

a multiple output selector, for selecting outputs from the delay units based on a mode information and outputting a plurality of output signals;

a plurality of multipliers, each multiplying a corresponding output signal from the multiple output selector with a corresponding coefficient;

an adder, for adding outputs from the multipliers, and an absolute unit, for getting an absolute value of an output of the adder, the offset time estimator indicating symbol boundary of received communication symbols based on an output of the absolute unit.

4. The time domain symbol timing synchronization circuit of claim 3, further comprising a multiplexer, coupled to the serial-connected delay units, for selecting one of the outputs from the serial-connected delay units based on a control signal from the offset time estimator.

5. The time domain symbol timing synchronization circuit of claim 1, wherein the communication system is an OFDM system and the receiver is a DAB receiver or a DVB receiver.

6. The time domain symbol timing synchronization circuit of claim 1, wherein the receiver is used to receive signals under Doppler fading channel.

7. A receiver in a communication system, the receiver comprising:

an converter, for converting analog input signals into digital signals;

a receiver frontend, coupled to the converter, for performing signal processing on the digital signals from the converter;

a FFT unit, coupled to the receiver frontend, for performing FFT on output signals from the receiver frontend;

a receiver backend, coupled to the FFT unit, for performing signal processing on output signals from the FFT unit; and a time domain symbol timing synchronization circuit, coupled to the receiver frontend and the FFT unit, for indicating symbol boundary of received communication symbols and getting symbol boundary of the received communication symbols with phase reference sequences performing like pseudo-noise sequences, wherein:

the time domain symbol timing synchronization circuit compares a position at a peak of a current cyclic prefix autocorrelation function of the received communication symbols and a position at a peak of a previous cyclic prefix autocorrelation function of the received communication symbols;

if (a) a difference of the positions is larger than a threshold and (b) the peak of the current cyclic prefix autocorrelation function is smaller than a reference average peak, the peak of the current cyclic prefix autocorrelation function is determined as false; the time domain symbol timing synchronization circuit weeds out and replaces the position at the peak of the current cyclic prefix autocorrelation function by the position at the peak of the previous cyclic prefix autocorrelation function; and the current peak is not introduced in calculation of the reference average peak.

8. The receiver of claim 7, wherein the reference average peak is a moving average of peaks of a plurality of previous cyclic prefix autocorrelation functions.

9. The receiver of claim 7, wherein the time domain symbol timing synchronization circuit comprises:

an autocorrelation function calculator; and an offset time estimator, coupled to the autocorrelation function calculator;

wherein the autocorrelation function calculator comprises:

a plurality of serial-connected delay units, for delaying a digital input signal;

a multiple output selector, for selecting outputs from the delay units based on a mode information and outputting a plurality of output signals;

a plurality of multipliers, each multiplying a corresponding output signal from the multiple output selector with a corresponding coefficient;

an adder, for adding outputs from the multipliers, and an absolute unit, for getting an absolute value of an output of the adder, the offset time estimator indicating start of received communication symbols based on an output of the absolute unit.

10. The receiver of claim 9, wherein the time domain symbol timing synchronization circuit further comprises a multiplexer, coupled to the serial-connected delay units, for selecting one of the outputs from the serial-connected delay units based on a control signal from the offset time estimator.

11. The receiver of claim 7, wherein the communication system is an OFDM system and the receiver is a DAB receiver or a DVB receiver.

12. The receiver of claim 7, wherein the receiver is used to receive signals under Doppler fading channel.

13. A time domain symbol timing synchronization method for communication systems, the method comprising:

(a) searching a position at a peak of a previous cyclic prefix autocorrelation function of the received communication symbols;

(b) searching a position at a peak of a current cyclic prefix autocorrelation function of the received communication symbols;

(c) comparing the peak positions;

(d) if a difference between the peak positions is larger than a threshold and the peak of the current cyclic prefix autocorrelation function is smaller than a reference average peak, weeding out and replacing the position at the peak of the current cyclic prefix autocorrelation function by the position at the peak of the previous cyclic prefix autocorrelation function; and (e) indicating symbol boundary of the received communication symbols based on the peak position which is not wed out.

14. The time domain symbol timing synchronization method of claim 13, wherein the step (c) comprising:

calculating a position difference between the position at the peak of the current cyclic prefix autocorrelation function and the position at the peak of the previous cyclic prefix autocorrelation function; and taking an absolute value of the position difference.

15. The time domain symbol timing synchronization method of claim 13, wherein the reference average peak is obtained by:

$$\text{ref\_peak} = \text{sum}(\text{peak\_amp}(i-j)/m * \text{ratio}(i-j)) \text{ from } j=1 \text{ to } j=m;$$

wherein "ref_peak" refers to the reference average peak, sum(·) refers to summation operation, peak_amp(i-j) is a previous j-th peak corresponding to the current peak peak_amp(i), m is a sampling number, and ratio(i-j) is the weighting factor of the previous j-th peak.

* * * * *